Dec. 31, 1957 R. M. BRINK 2,818,465

HALF-TONE DOT FACSIMILE SYSTEM

Filed June 15, 1954 3 Sheets-Sheet 1

INVENTOR
ROBERT M. BRINK
BY Campbell, Brumbaugh, Free and Graves
HIS ATTORNEYS

INVENTOR
ROBERT M. BRINK
BY Campbell, Brumbaugh, Free and Graves
HIS ATTORNEYS

Dec. 31, 1957 R. M. BRINK 2,818,465

HALF-TONE DOT FACSIMILE SYSTEM

Filed June 15, 1954 3 Sheets-Sheet 3

INVENTOR
ROBERT M. BRINK
BY Campbell, Brumbaugh, Free and Graves
HIS ATTORNEYS

United States Patent Office 2,818,465

Patented Dec. 31, 1957

2,818,465

HALF-TONE DOT FACSIMILE SYSTEM

Robert M. Brink, New Canaan, Conn., assignor to Time, Incorporated, New York, N. Y., a corporation of New York Application June 15, 1954, Serial No. 436,780

18 Claims. (Cl. 178—6.7)

This invention relates generally to a half-tone dot facsimile system and more particularly to a system of the above-noted character for producing through an optical sub-system a variable size light image adapted in turn to produce half-tone dots.

In ink printing reproduction of visual subjects such as photographs and the like, it is common to employ a half-tone process wherein areas of the subject of different tone density are represented by ink printed areas containing half-tone dots of different size. Thus, a photograph area of dark tone density may be represented by an ink printed area containing large half-tone dots, while conversely, a light tone-density area may be represented by an ink printed area containing small half-tone dots. This conversion of tone density values from full tone to half tone is generally accomplished by optically projecting through a half tone screen the visual subject in, say, the form of a negative onto the surface of a metal plate previously treated to render its surface photosensitive. The visual subject is accordingly impressed on the photosensitive surface in the form of a latent half-tone image. The plate is then etched to bring out the half-tone dots to thereby develop the image in relief. The half-tone dots so produced are adapted to carry ink in proportion to their size. Accordingly, the etched plate bearing the relief image when used as a printing block produces the described variable tone density ink printed areas.

Assuming that the visual subject to be printed is available in the form of a reproduction produced by a facsimile system, this reproduction, as is well known, takes the form of a composite of horizontal line elements of small width assembled side by side in a vertical direction. When such facsimile reproduction is used as the full tone image from which a half tone image is produced by optical transfer through a half-tone screen as set forth above, it has been found that if the screening pitch (the distance between dots per inch in the vertical direction) is on the same order as the scanning pitch (the displacement from one line to another in the vertical direction), there is produced an undesirable moire or diagonal pattern effect in the half-tone image because of inherently imperfect registration of the half-tone dots with the line elements. To avoid this moire effect, it has been the general practice heretofore to use a scanning pitch which is a great deal smaller than the screening pitch to thereby reduce any imperfect registration to the point where it becomes invisible. This dimensional relation between the half-tone dots and lines is commonly attained by modifying the scanning pitch to suit the screening pitch since the latter is ordinarily fixed to a standard value in accordance with the screening characteristic of a standard half tone screen. Accordingly, to satisfy the requisite that scanning pitch be much less than screening pitch, it has been necessary to produce a facsimile reproduction composed of a much greater number of lines and thereby taking much longer time to completely develop than would be required if the scanning pitch could be rendered equal to the screening pitch. This inordinate time required to develop the facsimile reproduction, is of course, disadvantageous.

In contrast to the above-described technique, there may be employed a facsimile system which reproduces a visual subject as a half-tone rather than a full-tone image, the half-tone dots being introduced into the reproduced visual subject by pulsing the line generating light beam so that each line element is composed of dots formed by light pulses. The registration problem between dots and lines is thus avoided with consequent elimination of the cause of the undesired moire effect.

Attempts have been made in the past to develop facsimile systems which would reproduce, as described, a visual subject in a half-tone manner. The optical arrangements of these prior art systems have, however, been unsatisfactory in a number of ways. For example, in such systems the line scanning spot of the light beam has been given a rectangular configuration with one dimension of the rectangle being variable to produce the desired variable size half-tone dot. With such variable rectangular configuration, however, the half-tone dot produced is not symmetrical about a center point with the result that the array of rectangular half-tone dots presents a visually inappropriate grating pattern instead of the desired cross-hatch pattern conventional in half-tone reproduction. Moreover, when (as is the usual case) only one side of the rectangle is moved to change the size thereof, the half-tone dot produced will have a shifting center which is again undesirable.

It is accordingly an object of this invention to provide optical apparatus for generating a variable size light image in a mode free of the disadvantages discussed above.

It is a further object of this invention to provide optical apparatus of the above-noted character for generating an image which is symmetrical in shape about a fixed center point.

Yet another object of this invention is to provide optical apparatus of the above-noted character for converting an electric signal input into a light image output.

An additional object of the invention to provide apparatus of the above-noted character characterized by an adjustable quantitative relation between the electric signal input and the size of the light image output.

An additional object of the invention is to provide apparatus of the above-noted character as a component of a half-tone dot facsimile system which produces a half-tone reproduction having equal scanning and screening pitches.

These and other objects of the invention are accomplished by providing in an optical path (extending from a light source through a transverse plane to a viewing zone) a specular means which defines by a pair of light deflecting surfaces a dihedral angle extending from the plane edgewise along the path towards the zone. Between the light source and the transverse plane there is provided an optical means operable on source emitted light to form in the plane a luminous simple image at least a portion of which occupies the vertex region of the dihedral angle. There is also provided in the optical path a light valve means for varying the size of the image portion in this vertex region. The described pair of faces multiply reflect this variable size, simple image portion to form therefrom at the viewing zone a compound image of a size determined by that of the simple image portion.

As a feature of the invention the light valve means may be responsive to an electric signal input to vary the size of the compound image as a function of the electric signal. By appropriate circuit means, the functional relation between the image size and the electric signal may be made selective. Also, the above-described organization may form a component of a half-tone dot facsimile system wherein the electric signal represents scanned tone density details of the visual subject, the compound image acts as a scanning spot, and wherein the light beam which forms the compound image is pulsed to produce reproductions of the compound image in the form of half-tone dots distributed in line elements upon a photosensitive medium.

The invention will be better understood from the following detailed description of an embodiment thereof illustrated by the accompanying drawings wherein.

Figures 1, 2, 3A, 3B:
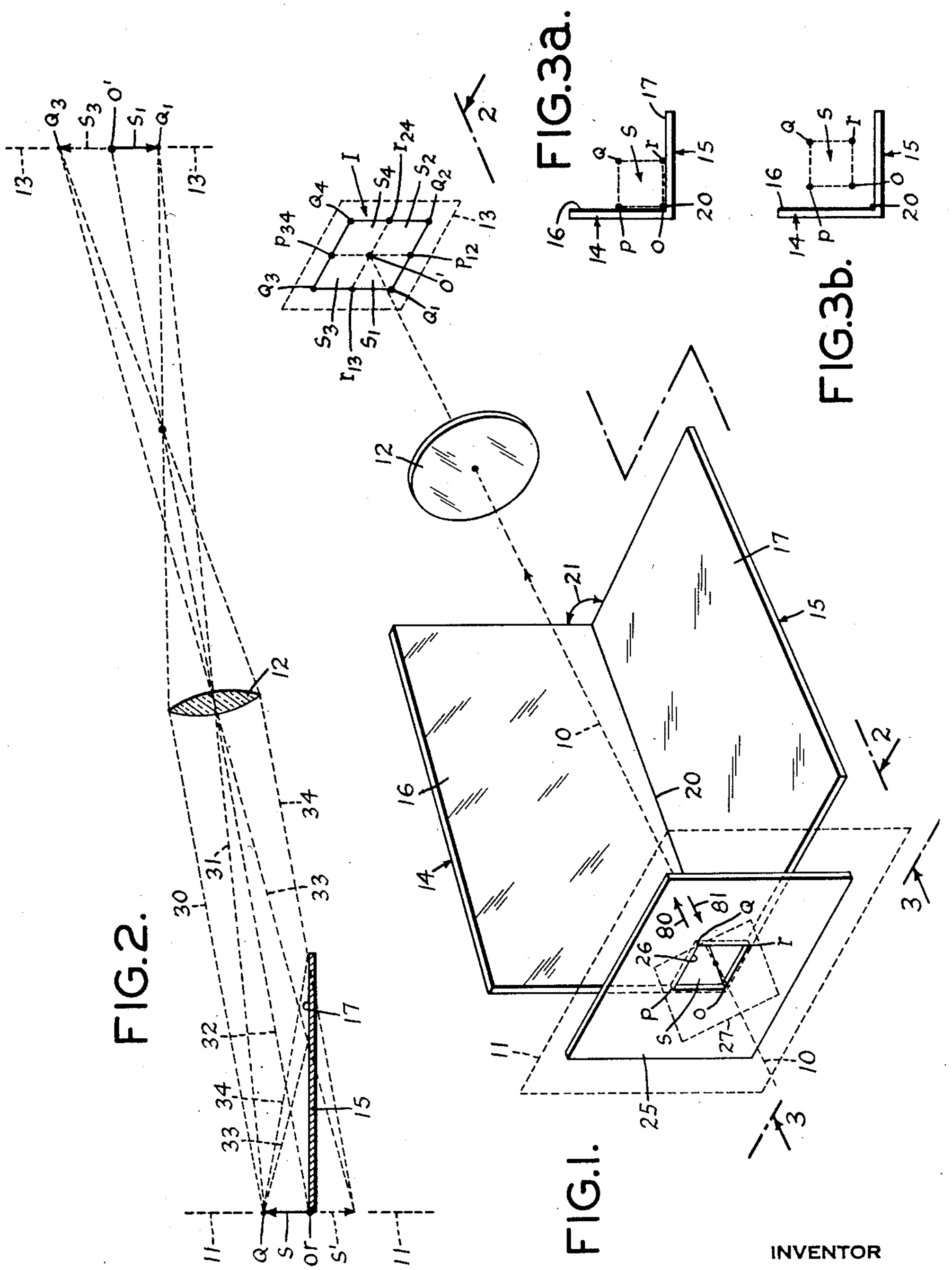
Fig. 1 is a perspective view of an optical system for forming a compound image.
Fig. 2 is a diagram of certain optical relations in Fig. 1 when viewed in the direction of the arrows 2—2 of Fig. 1.
Figs. 3A and 3B are diagrams of certain other optical relations in Fig. 1 when the same is viewed in the direction of the arrow 3—3 of Fig. 1.
Figure 5A:
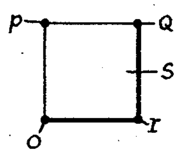

Figs. *5a–5d*, *6a–6d* and *7a–7d* are diagrams of aid in explaining the operation of the presently disclosed embodiment of the present invention; and Figs. *8a* and *8b* represent variations of the embodiment shown in Fig. 1.

Referring now to Fig. 1 there is shown therein a section of an optical path 10 which extends from the left through a plane 11 perpendicularly transverse to the optical path, through an optical means in the form of the focusing lens 12, and to a viewing zone 13. Between plane 11 and lens 12 is a specular means which for convenience of illustration is shown as a pair of members 14, 15, respectively provided with the light reflecting faces 16, 17 in the form of mirrors. In practice, the faces of a prism may be substituted for the mirror faces 16, 17. Accordingly, it will be understood that the terms "specular" and "light reflecting," unless otherwise noted, are to be taken in a general sense to denote a diverting of light by a surface such that, with respect to the surface, the incident and emanating angles of the light are the same whether such diversion is caused by reflection or refraction, as these terms are taken in the narrow sense.

The faces 16, 17 are joined at a common edge 20. Accordingly, faces 16, 17 define, as a geometric configuration, a dihedral angle extending from the plane 11 edgewise along optical path 10 towards the viewing zone 13, the angular value of this dihedral angle being measured by that of the plane angle defined by the dihedral angle in a plane perpendicular to edge 20. One such plane angle is formed, for example, in plane 11 by the intersection line of plane 11 with face 16 and the intersection line of plane 11 with face 17, and another may be represented by the arrow 21 at the far end of edge 20. The axis of optical path 10 and edge 20, while lying in a common plane (not shown) which bisects dihedral angle 21, are at a slight angle with respect to each other to provide an edge-tilted relation between the dihedral angle and the optical path axis.

As further shown in Fig. 1, a diaphragm member 25 is disposed to define within plane 11 a square aperture 26 having the corners *o, p, q, r,* so located that the margins *op* and *or* of the aperture lie, respectively, within the planes of the faces 16, 17. By means later described, a beam of light is projected from left to right along optical path 10 to form at diaphragm 25 a luminous image 27 which, for the showing in Fig. 1, completely fills with light the space of the aperture 26. Hence, there is defined within this aperture an image portion *s* having the same corners *o, p, q, r* and margins as the aperture 26 itself.

The image portion *s* is a simple luminous image which radiates light onto reflecting faces 16, 17 in much the same manner as light would be radiated by an illuminated object of such object occupied the same space in aperture 26. Accordingly, the faces 16, 17 produce a multiple reflection of image portion *s*, which multiple reflection in conjunction with the focusing action of lens 12 results in the production at viewing zone 13 of a plurality of images $s_1$, $s_2$, $s_3$, $s_4$, each of which is a representation of the simple image portion *s*. It will be seen that images $s_1$, $s_2$, $s_3$ and $s_4$ are respectively formed from image portion *s* by (1) direct viewing of the image portion, (2) simple reflection from face 16, (3) simple reflection from face 17 and (4) complex reflection from faces 16, 17. The mode of plural image formation will be better understood by reference to the optical diagram of Fig. 2 wherein the several of the images are represented by arrows. In this figure the light ray lines 30, 31, 32, when traced out show that image $s_1$ is an inverted form of image portion *s* obtained by direct viewing of this image portion. Also, the light ray lines 32, 33, 34, when traced out, show that the image $s_3$ represents a form of image portion *s* obtained by simple reflection of light rays from the mirror face 17. Note that image $s_3$ is, in fact, an inverted form of a virtual image *s'* which by projection of light rays 33, 34 backward through face 17 along dotted lines 35, 36 appears to be image portions *s* in an upside down version thereof located below face 17 and in transverse plane 11.

If the dihedral angle defined by faces 16, 17 is given a value of 360/N degrees, where N is an integer, each point of image portion *s* is duplicated N times in symmetrical fashion about a fixed center point. Thus, if N is the integer 4 so that, as shown in Fig. 1, the dihedral angle has a 90° value, the corner point *q* of image portion *s* is duplicated four times in zone 13 as the points $q_1$, $q_2$, $q_3$ and $q_4$ symmetrically disposed about a fixed center point *o'* which represents the corner point *o* of image portion *s* at the vertex of the dihedral angle. It follows, in the case described, that the images $s_1$, $s_2$, $s_3$, $s_4$ themselves will always orient themselves about a fixed center point whether these images are spaced apart or are grouped together (as shown in Fig. 1) to form a common compound image I.

Moreover, in accordance with the present invention, the image portion *s* occupies in plane 11 a vertex region of the dihedral angle such that the image portion occupies the wedge of this vertex region. Elucidating what is meant by occupancy of the "wedge" of the vertex region, the phrase is used to denote that a corner point *o* of the image portion is at the vertex point formed by edge 20 viewed end-on, and that the two margins of the image portion emanating from this corner point lie, as far as they run, in the faces 16, 17 which form the sides of the dihedral angle. Fig. 3A shows an image portion *s* which occupies, according to the definition, a wedge of the considered vertex region in that corner point *o* coincides with edge 20, and in that the margins *op* and *or*, as far as they run, lie in the faces 16, 17. By way of contrast, Fig. 3B shows an image portion *s* which does not occupy the wedge of a vertex region as defined.

Where the image portion *s* so occupies the wedge of a vertex region, this image portion will appear to be continuous with the virtual images seen in the mirror faces by simple reflection. For example, as shown in Fig. 2, the base of image portion *s* and the upside down base of its virtual image *s'* will, in appearance, both lie at the intersection of plane 11 with face 17, this intersection corresponding to the line *or* in Fig. 1. It follows that the virtual images seen in the mirror faces by complex reflection (for example, the unshown virtual image corresponding with the real image $s_4$) will appear to be continuous with the virtual images formed by simple reflection. Thus, the several real images $s_1$, $s_2$, $s_3$ and $s_4$ developed in zone 13 will all include in common the center point *o'* in such manner that any given image will share two margins emanating from this center point with the others of said images which lie to either side of the given image. This situation is illustrated in Fig. 1 wherein the images $s_1$ and $s_3$ share as a common margin the line between points $o'$ and $r_{13}$, $s_3$ and $s_4$ share the line $o'$ and $p_{34}$, $s_4$ and $s_2$ share the line of $o'$ and $r_{24}$, and $s_4$ and $s_1$ share the line of $o'$ and $p_{12}$.

To summarize the foregoing, if the dihedral angle between faces 16, 17 measures 360/N degrees, where N is an integer, and if the image portion $s$ in plane 11 occupies the wedge of a vertex region of the dihedral angle, there will be developed at viewing zone 13, by multiple reflection from faces 16, 17, a continuous compound image I of N facets where each facet is a separate representation of the image portion $s$. This compound image is symmetrical about a spatially fixed point $o'$ common to each facet. From the nature of the compound image it will be seen that by producing (by means about to be described) a variance in the size of image portion $s$ in such mode that the image portion in shape continues to conform to a wedge of the vertex region, there will be produced a corresponding variance in size of the compound image by a shift in the outline thereof towards or away from its center point. This variable size compound image among its other uses is of highly advantageous application in the half-tone dot facsimile system now to be described.

Figures 4, 8A, 8B:
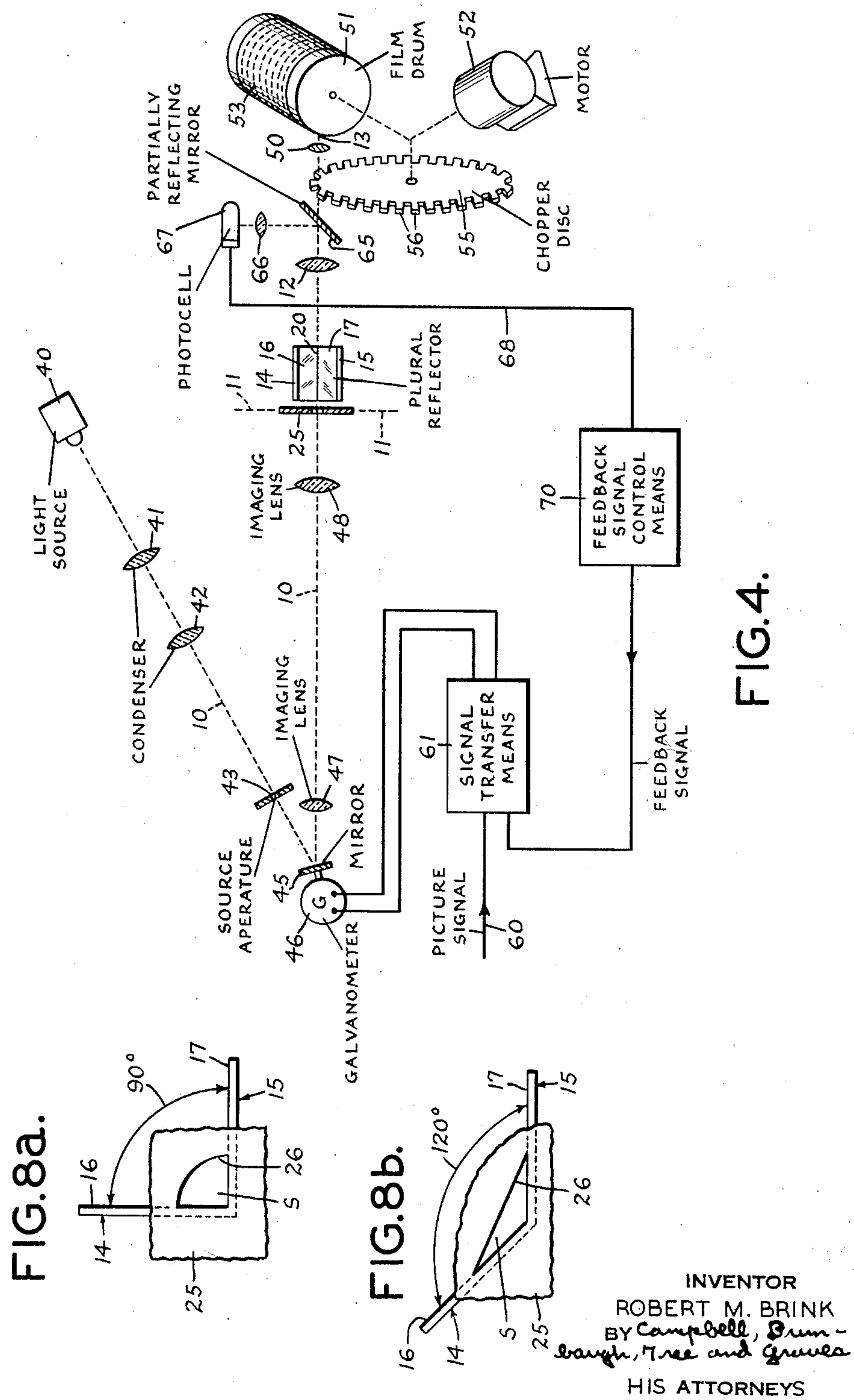
Fig. 4 is a plane view in diagrammatic form of a half-tone facsimile system in accordance with the present invention.

Referring now to Fig. 4, the optical path 10 originates with a light source 40 which may be, for example, a high intensity glow lamp. From source 40 the optical path passes through first optical means formed by lenses 41, 42 and thence through the aperture of a diaphragm 43. Lenses 41 and 42 cooperate as an optical condenser to fill the aperture of diahphragm 43 with light emitted from source 40. Diaphragm 43 thus acts as a means for providing at its location in the path an image source in the form of a light beam of given cross section projected along the path to further points thereon.

Beyond diaphragm 43 the optical path 10 is deflected by a movable light deflecting means. This movable light deflecting means may take the form of any movable means, such as a movable prism for selectively deflecting the course of the optical path, but for convenience is shown as a mirror 45 driven by electromechanical means, such as a galvanometer 46. From mirror 45, optical path 10 proceeds through second optical means in the form of the imaging lenses 47, 48 to the transverse plane 11 containing the diaphragm 25 better shown in Fig. 1. At plane 11, the light rays in the optical path are formed by the lenses 47, 48 into the luminous image 27 (Fig. 1) of the light beam cross section framed by the aperture of diaphragm 43.

As heretofore described, the image portion $s$ of the image at plane 11 is multiply reflected from mirror faces 16, 17 to be focused by lens 12 to form a compound image at viewing zone 13. An auxiliary lens 50 may be employed with lens 12 for better focusing action, the auxiliary lens causing a reversal of the compound image from its disposition in Fig. 1. For facsimile reproduction, a carrier means in the form of the scanner drum 51 may be rotated by a drive motor 52 to move a photosensitive medium 53 on the surface of the drum transversely past the viewing zone 13. Between each rotation, the scanner drum 51, by means (not shown) well known to the art, is given a small constant increment of axial displacement. Accordingly, the compound image at viewing zone 13 will trace out over photosensitive medium 53 a series of axially displaced line elements as is usual in facsimile reproduction.

To convert the compound image at viewing zone 13 into half-tone dots distributed in each line element generated on medium 53, there is provided a light pulsing means operated in timed relation with the rotation of drum 51 and taking the form, for example, of a chopper disc 55 with a periphery of teeth 56 which, by rotation of the chopper disc, move transversely through optical path 10 between viewing zone 13 and the mirror faces 16, 17. As chopper disc 55 rotates, the light rays in path 10 are alternately blocked by teeth 56 from reaching zone 13 and permitted passage to this zone by the gaps between the teeth. The chopper disc action accordingly generates periodically timed, short interval appearances of the compound image at the viewing zone. By means (not shown) well known to the art, the chopper disc rotation may be geared to the rotation of drum 51 to advance an extra half tooth for each drum rotation. In this manner, a staggered effect may be obtained between the half-tone dots in alternate line elements generated on medium 53.

The visual information to be reproduced on medium 53 is supplied in the form of an electric signal on lead 60 to an input of a signal transfer means 61 such as an amplifier. The output of the amplifier energizes galvanometer 46 to drive mirror 45 to determine the nature of the compound image in a manner soon to be described.

To provide a predetermined quantitative relation between the size of the compound image and the amplitude of the electric signal input to the system, a beam splitting means in the form of a partial mirror 65 is interposed in optical path 10 between viewing zone 13 and the compound image forming faces 16, 17. Partial mirror 65 diverts a fraction of the light rays representing the compound image out of the main optical path throguh a focusing lens 66 and to a photoelectric means 67, such as a photocell. The photocell 67 converts these diverted light rays into an electric feedback signal which, through a feedback circuit 68, is returned to the input of the amplifier 61.

The input/output ratio of the amplifier 61 is a function of the ratio between the original input signal fed to the amplifier by lead 60 and the feedback signal fed to the amplifier through feedback circuit 68. Accordingly, by proper adjustment of the ratio between the original input signal and the feedback signal, there may be obtained any desired relation between compound image size and original input signal, as, for example, the relation where the area of the compound image becomes substantially directly proportional to the amplitude of the original input signal. To provide selectivity in this relation, the feedback circuit 68 may include a feedback signal control means 70, such as a variable attenuator or variable amplifier which is adapted to selectively change the feedback signal strength between its input and its output. This feedback signal control means 70 may be either linear or non-linear in action.

Considering now how variance in the size of the compound image is obtained, the mirror 45 (Fig. 4) is adapted when driven by its galvanometer 46 to cause a sweeping of the image 27 (Fig. 1) in the transverse plane 11 back and forth at a diagonal through aperture 26, as shown by arrows 80, 81. The amount of this image sweep in the direction of arrow 81 from a reference position where image portion $s$ just fills aperture 26 is commensurate with the amplitude of the electric signal which drives galvanometer 46. In this connection an increase in signal amplitude produces a decrease in size of the compound image in the manner now to be described.

Assume that in the course of the mirror motion the image 27 is initially in the position shown in Fig. 1 such that the image portion $s$ thereof framed by aperture 26 is just far enough upward and to the right to completely occupy the space within this aperture. Image portion $s$, accordingly, has a size and shape shown in Fig. 5*a* to produce a compound image of the size and shape shown in Fig. 6*a* to in turn produce a half-tone dot pattern on medium 53 (Fig. 4) of the dots 82, 83, 84, 85 shown in Fig. 7*a*. In connection with this half-tone dot pattern, the dots 82, 83 thereof lie in one line element 86 on medium 53, while the dots 84, 85 lie in an adjacent line element 87, it being assumed that the dots developed by the full size compound image (Fig. 6*a*) are contiguous with each other in each line element and also contiguous with each other from one line element to another. Assume now that by movement of mirror 45 (Fig. 4) the image 27 (Fig. 1) is progressively shifted in the direction indicated by arrow 81. The progressive advance of the upper right-hand margin of image 27 towards the corner point *o* will cause a progressive reduction in size of the image portion *s* within the aperture. Accompanying this change in size, a change in shape of the image portion occurs, this change in shape being describable as a progressive truncation of the image portion configuration by a diagonal line which advances parallel to itself from the corner point *q* to the corner point *o*. Figs. 5*a*–5*d* show, in sequence, the nature of the changes occurring in image portion *s*.

When image portion *s* changes, as shown in Figs. 5*a*–5*d*, the compound image I correspondingly changes, as shown in Figs. 6*a*–6*d*, to produce the respective half-tone dot patterns of Figs. 7*a*–7*d*. With regard to change in size it will be noted that in the patterns of Figs. 7*a*–7*d* the varying size half-tone dots are always generated by the described facsimile system within and as parts of the line elements developed on medium 53 (Fig. 4) during visual subject reproduction. Thus, the disclosed facsimile system is operable to directly produce a half-tone image with a screening pitch equal to scanning pitch. This feature is advantageous for the reasons given heretofore.

Figure 6A:
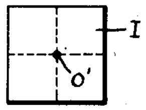
Figure 7A:
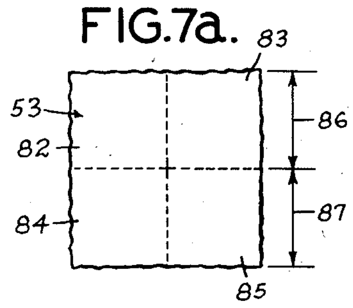
Figure 5B:
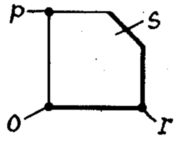
Figure 6B:
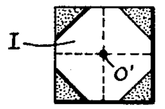
Figure 7B:
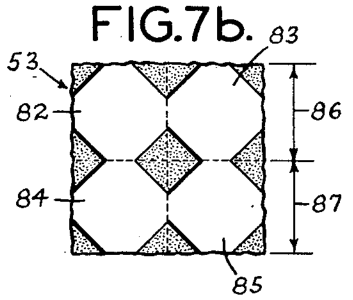
Figure 5C:
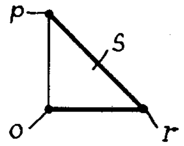
Figure 6C:
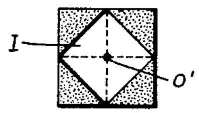
Figure 7C:
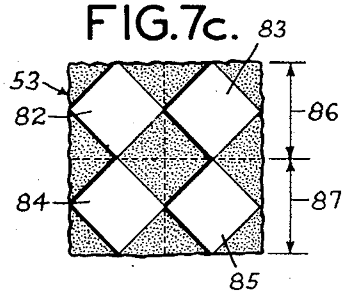
Figure 5D:
Figure 6D:
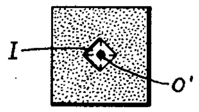

With regard to shape, it will be noted that the compound image in the course of shrinking remains continuously centered and symmetrical in configuration about the spatially fixed point *o′*. These characteristics of continuous symmetry and continuous centering about a spatially fixed point are also advantageous in that a true cross-hatch pattern, desirable for half-tone reproduction, is formed by the dots. Further, with regard to shape, note that as the compound image lessens in size, it changes in shape from an original square (Fig. 6*a*) to an octagon (Fig. 6*b*) to another square (Fig. 6*c*) rotated 45° with respect to the original square (Fig. 6*a*). Thus, the described system not only produces a variance in size, but also a variance in the shape of the half-tone dots.

This change in shape during decrease in size provides one degree of control over dot shape. Moreover, the present system provides a second degree of control over shape in that the initial or full size shape of the compound image may be given different configurations. For example, if, as shown in Fig. 8*a*, the aperture 26 (and thus the image portion *s*) takes the form of a quadrant, the compound image will be of circular shape, while if, as shown in Fig. 8*b*, the dihedral angle is 120° and aperture 26 (and thus image portion *s*) takes the form of an isoceles triangle, the compound image will be of the shape of an equilateral triangle. With these two degrees of shape control, it will be seen that the presently described system provides an unusual freedom in selecting a desired shape characteristic for the half-tone dots developed by the system.

Figure 7D:
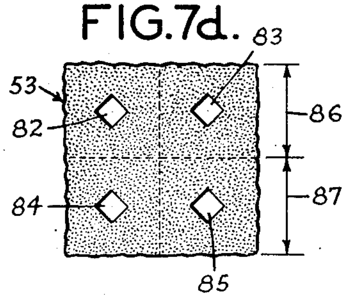

In connection with the change in shape shown in Figs. 7*a*–7*d*, it will be noted that as the dot size decreases, the margins commonly shared by adjacently disposed dots shrink from full sharing (Fig. 7*a*) to partial sharing (Fig. 7*b*), to sharing at corner points only (Fig. 7*c*) to no sharing at all (Fig. 7*d*). Considering tone density as a function of dot size, the transition stage (Fig. 7*c*) between sharing and no sharing of dot margins represents, insofar as appearance is concerned, a discontinuity in the scale of tone density values. In other words, keeping in mind that the half-tone dots when printed take the form of dark ink spots, there will be a "jump" in apparent printed tone density from dark to light following the stage of Fig. 7*c* even though the dot size changes linearly. This tone density jump is disadvantageous since it makes an area of the original visual subject of transition tone density appear when printed as an area of lighter or darker tone density, as the case may be, than it should appear. The presently disclosed system affords a means of overcoming this difficulty since by utilizing a feedback signal control means 70 (Fig. 4) having a non-linear signal transfer characteristic for the feedback signal range of values developed during the transition between sharing and no sharing of dot margins, it is possible to compensate through the feedback signal for the apparent tone density discontinuity which would otherwise occur. This non-linear characteristic may be built into the feedback signal control means 70 in a well-known manner.

Another event characterizing the transition stage for dot size is that of "bridging effect," a phenomenon wherein, during the etching of the half-tone plate, the portions of individual dots not bordering the margins commonly shared with other dots are disproportionately eaten away by the etching fluid. The tendency of "bridging effect" is, thus, to obliterate the desired pattern leaving behind only a network of thin "bridges" running individually between what remains of the dot centers. The degree to which bridging effect occurs is thought to depend to an extent upon the shape which the dots assume. Accordingly, since the described system provides a large degree of control over the shape of the half-tone dots as well as their size, it is possible in accordance with the present invention to produce dots of optimum shape for resisting "bridging effect."

While the description above applies to one embodiment of the disclosed invention, it will be understood that a number of variations and modifications thereof are included within the purview of the invention. For example, the mirror 45 (Fig. 4) in causing a variance in size, as described, of the image portion *s* within aperture 26 (Fig. 1) acts essentially as a light valve means. In place of the mirror, other light valve means, such as the ribbon type light valve used for producing sound tracks on motion picture film, may also be employed to vary the size of the image portion *s*. Where a ribbon type light valve is used, the image portion *s* would be formed within the variable size aperture of the light valve. Instead of the disclosed dihedral angle of 90°, other dihedral angles such as 60° may be utilized in accordance with the formula 360/N, where N is an integer. As mentioned, other configurations for the image portion *s* may be utilized other than the square configuration shown. A means for pulsing the light source 40 may be utilized in place of the chopper disc 55 for producing dots from the compound image. Other variations and modifications will occur to one skilled in the art. The embodiment disclosed, therefore, is not to be regarded as limiting in any way the scope of the following claims.

I claim:

1. Variable image size optical apparatus comprising, a light source in an optical path extending through a transverse plane to a viewing zone, specular means defining by a pair of light reflecting faces a dihedral angle extending from said plane edgewise along said path towards said zone, optical means between said source and plane operable on source emitted light to form in said plane a luminous simple image at least a portion of which occupies the vertex region of said angle, and light valve means for varying the radial size, taken with respect to said vertex, of said simple image portion, said pair of faces multiply reflecting said simple image portion to form therefrom at said viewing zone a compound image of a size determined by that of said simple image portion.

2. Apparatus as in claim 1 wherein said light valve means is a movable light deflecting means in said path ahead of said specular means for producing in said plane as a movement response a selective transverse image shift which varies the radial size of said image portion in said vertex region.

3. Variable image size optical apparatus comprising, a light source in an optical path extending through a normally transverse plane to a viewing zone, specular means defining by a pair of light reflecting faces a dihedral angle measuring 360/N degrees, where N is an integer and extending from said plane towards said zone in edge-tilted relation with the axis of said path, optical means between said source and plane operable on source emitted light to form in said plane a luminous simple image at least a portion of which occupies a wedge of the vertex region of said angle, and light valve means for varying the radial size, taken with respect to said vertex, of said simple image portion, said pair of faces multiply reflecting said simple image portion to form therefrom at said viewing zone a symmetrical compound image of N facets and of a size determined by that of said simple image.

4. Variable image size optical apparatus comprising, image source means for providing a beam of light of given cross section at said means lying in an optical path extending from said means through a transverse plane to a viewing zone, specular means defining by a pair of light reflecting faces a dihedral angle extending from said plane edgewise along said path towards said zone, optical means between said plane and image source means operable on said light beam to form in said plane as a representation of said cross section a luminous simple image at least a portion of which occupies the vertex region of said angle, and light valve means for varying the radial size, taken with respect to said vertex, of said simple image portion, said pair of faces multiply reflecting said simple image portion to form therefrom at said viewing zone a compound image of a size determined by that of said simple image portion.

5. Variable image size optical apparatus comprising, a light source in an optical path extending through a transverse plane to a viewing zone, specular means defining by a pair of light reflecting faces a dihedral angle extending from said plane edgewise along said path towards said zone, diaphragm means defining an aperture in said path between said source and plane, first optical means for flooding said first aperture with light from said source, second optical means for forming in said plane as a representation of said aperture a luminous simple image at least a portion of which occupies the vertex region of said angle, and light valve means for varying the radial size, taken with respect to said vertex, of said simple image portion, said pair of faces multiply reflecting said simple image portion to form therefrom at said viewing zone a compound image of a size determined by that of said simple image portion.

6. Apparatus as in claim 5 further characterized by second diaphragm means defining in said plane an aperture for framing said image portion in said vertex region.

7. Apparatus as in claim 5 further characterized by third optical means in said path between said specular means and viewing zone for bringing said compound image into focus at said zone.

8. Variable image size optical apparatus comprising, a light source in an optical path extending through a transverse plane to a viewing zone, specular means defining by a pair of light reflecting faces a dihedral angle extending from said plane edgewise along said path towards said zone, optical means between said source and plane operable on source emitted light to form in said plane a luminous simple image at least a portion of which occupies the vertex region of said angle, light valve means for varying the radial size, taken with respect to said vertex, of said simple image portion, said pair of faces multiply reflecting said simple image portion to form therefrom at said viewing zone a compound image of a size determined by that of said simple image portion, and light pulsing means operable periodically to generate time separated appearances of said compound image at said zone.

9. Electric signal to light image conversion apparatus comprising, a light source in an optical path extending through a transverse plane to a viewing zone, specular means defining by a pair of light reflecting faces a dihedral angle extending from said plane edgewise along said path towards said zone, optical means between said source and plane operable on source emitted light to form in said plane a luminous simple image at least a portion of which occupies the vertex region of said angle, and signal responsive light valve means for varying the size of said simple image portion as a function of an input of said electric singal, said pair of faces multiply reflecting said simple image portion as a function of an input of said electric signal, said pair of faces multiply reflecting said simple image portion to form therefrom at said viewing zone a compound image of a size determined by that of said simple image portion.

10. Apparatus as in claim 9 wherein said light valve means comprises a movable light deflecting means in said path ahead of said specular means for producing in said path as a movement response a selective transverse image shift which varies the size of said image portion in said vertex region, and electromechanical means for moving said light deflecting means as a function of an input of said electric signal to said electromechanical means.

11. Electric signal to light image conversion apparatus comprising, a light source in an optical path extending through a normally transverse plane to a viewing zone, specular means defining by a pair of light reflecting faces a dihedral angle measuring 360/N degrees, where N is an integer, and extending from said plane towards said zone in edge-tilted relation with the axis of said path, optical means between said source and plane operable on source emitted light to form in said plane a luminous simple image at least a portion of which occupies the wedge of a vertex region of said angle, and signal responsive light valve means for varying the size of said simple image portion as a function of an input of said electric signal, said pair of faces multiply reflecting said simple image portion to form therefrom at said viewing zone a symmetrical compound image of N facets and of a size determined by that of said simple image.

12. Electric signal to light image conversion apparatus comprising, a light source in an optical path extending through a transverse plane to a viewing zone, specular means defining by a pair of light reflecting faces a dihedral angle extending from said plane edgewise along said path towards said zone, optical means between said source and plane operable on source emitted light to form in said plane a luminous simple image at least a portion of which occupies the vertex region of said angle, signal transfer means with an output and an input adapted to be supplied by said electric signals, light valve means responsive to the signal from said output for varying the size of said simple image portion as a function of said electric signal, said pair of faces multiply reflecting said simple image portion to form therefrom at said viewing zone a compound image of a size determined by that of said simple image portion, and photoelectric means optically coupled in image-receiving relation with said path for modifying the input/output electric signal ratio of said signal transfer means as a function of image size.

13. Electric signal to light image conversion apparatus comprising, a light source in an optical path extending through a transverse plane to a viewing zone, specular means defining by a pair of light reflecting faces a dihedral angle extending from said plane edgewise along said path towards said zone, optical means between said source and plane operable on source emitted light to form in said plane a luminous simple image at least a portion of which occupies the vertex region of said angle, amplifier means with an output and an input adapted to be supplied by said electric signal, light valve means responsive to the signal from said output for varying the size of said simple image portion as a function of said electric signal, said pair of faces multiply reflecting said simple image portion to form therefrom at said viewing zone a compound image of a size determined by that of said simple image portion, beam splitting means in said path between said specular means and said zone for diverting a fraction of the light constituting said compound image out of said path, and photoelectric means for converting said diverted light into a feedback signal supplied through a feedback circuit to the input of said amplifier means, said feedback signal modifying the input/output electric signal ratio of said amplifier means as a function of the size of said compound image.

14. Apparatus as in claim 13 further characterized by a signal control means in said feedback circuit for varying the ratio between respective feedback signal amplitudes at said photoelectric means and at the input of said amplifier means.

15. Half-tone image facsimile reproduction apparatus comprising, a light source in an optical path extending through a transverse plane to a viewing zone, specular means defining by a pair of light reflecting faces a dihedral angle extending from said plane edgewise along said path towards said zone, optical means between said source and plane operable on source emitted light to form in said plane a luminous simple image at least a portion of which occupies the vertex region of said angle, signal responsive light valve means for varying the size of said portion as a function of an input of said electrical signal, said pair of faces multiply reflecting said simple image portion to form therefrom at said viewing zone a compound image of a size determined by that of said simple image portion, carrier means for moving a photosensitive medium transverse to said path through said zone, and light pulsing means operable periodically to generate time separated short interval appearances of said compound image at said zone.

16. Half-tone image facsimile reproduction apparatus comprising a light source in an optical path extending through a normally transverse plane to a viewing zone, specular means defining by a pair of light reflecting faces a dihedral angle measuring 360/N degrees, where N is an integer, and extending from said plane towards said zone in edge-tilted relation with the axis of said path, optical means between said source and plane operable on source emitted light to form in said plane a luminous simple image at least a portion of which occupies a wedge of the vertex region of said angle, signal responsive light valve means for varying the size of said simple image portion as a function of an input of said electric signal input, said pair of faces multiply reflecting said simple image portion to form therefrom at said viewing zone a symmetrical compound image of N facets and of a size determined by that of said simple image portion, carrier means for moving a photosensitive medium transverse to said path through said zone, and image chopper means in said path between said specular means and said zone for producing half-tone dots on said medium by generating periodically timed short interval appearances of said compound image at said zone.

17. Electric signal to light image conversion apparatus comprising, signal transfer means adapted to convey visual data electric signals between an input and an output thereof, electrooptical means responsive to said signals at said output for forming from a body of light flux a luminous image varying in size as a function of said electric signals, photoelectric means disposed to receive from said light flux body an amount of light flux commensurate with the size of said image for conversion of said received light flux into a feedback signal, and feedback circuit means for varying the input/output ratio of said signal transfer means as a function of said feedback signal.

18. Half-tone image facsimile apparatus comprising, signal transfer means adapted to convey visual data electric signals between an input and an output thereof, electrooptical means responsive to signals at said output for forming from a body of light flux and at a given zone in space a luminous image varying in size as a function of said electric signals, image pulsing means operable to generate periodic appearances of said image at said zone, carrier means for moving a photosensitive medium through said zone with linear relative motion between said medium and image at a speed accommodated to the image size and appearance rate to respectively develop common margin and separate margin half-tone dots on said medium from images of sizes respectively greater and less than a transitional size, photoelectric means disposed to receive form said light flux body in accordance with said image size an amount of light flux for conversion of said received light flux into a feedback signal, feedback circuit means for varying the input/output ratio of said signal transfer means as a function of said feedback signal, and feedback signal control means nonlinearly responsive to feedback signal amplitudes representing image sizes approximating said transitional size for changing the ratio between respective amplitudes of said feedback signal manifested at said photoelectric means and at said signal transfer means, said non-linear response of said control means being adapted to compensate for a tone density discontinuity characterizing the transition in size from common margin to separate margin half-tone dots.

References Cited in the file of this patent

UNITED STATES PATENTS

| | | |
|---|---|---|
| 1,683,894 | Ives | Sept. 11, 1928 |
| 1,990,867 | Harvey | Feb. 12, 1935 |
| 2,530,275 | Weingarten | Nov. 14, 1950 |